Patented May 6, 1952

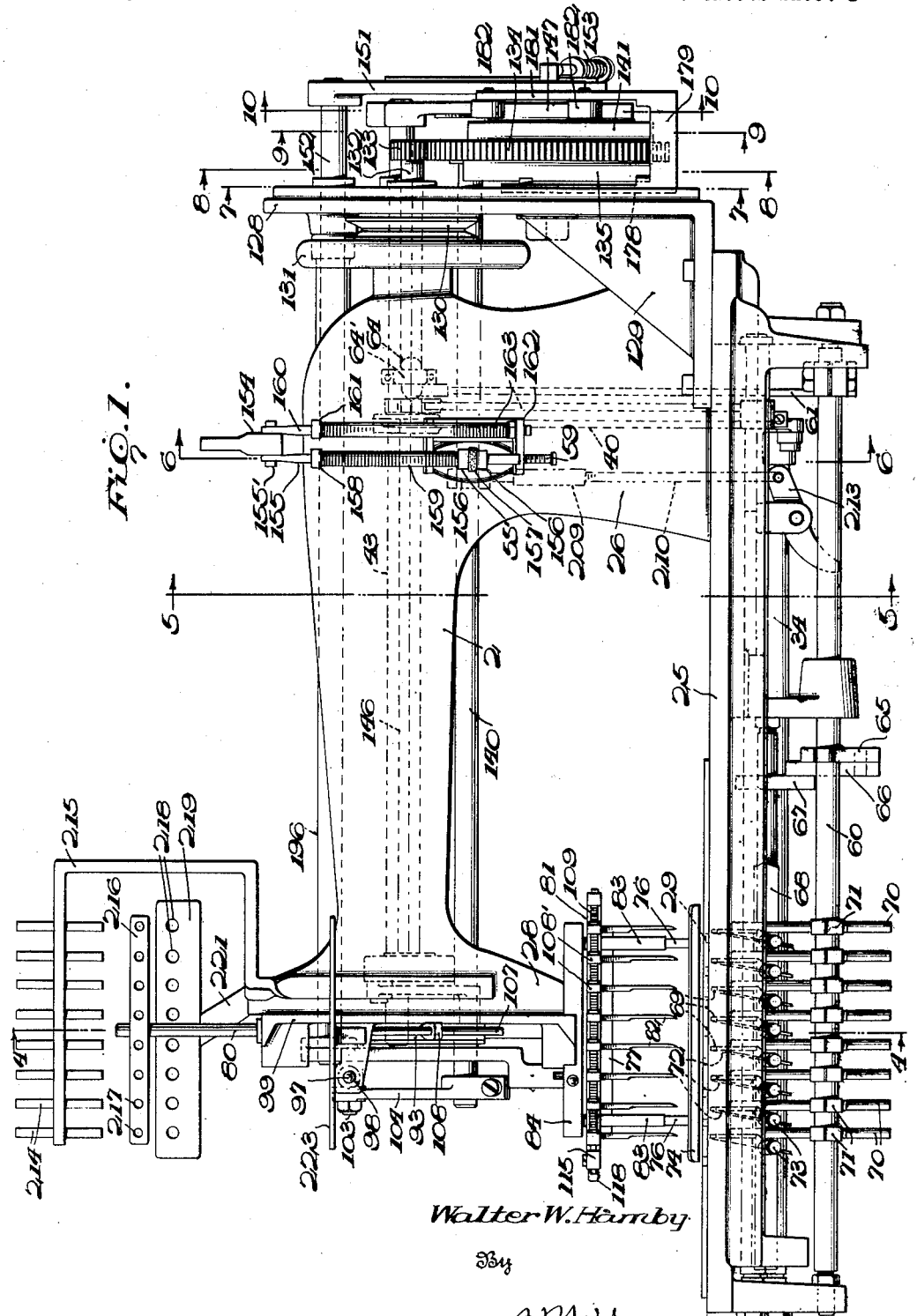

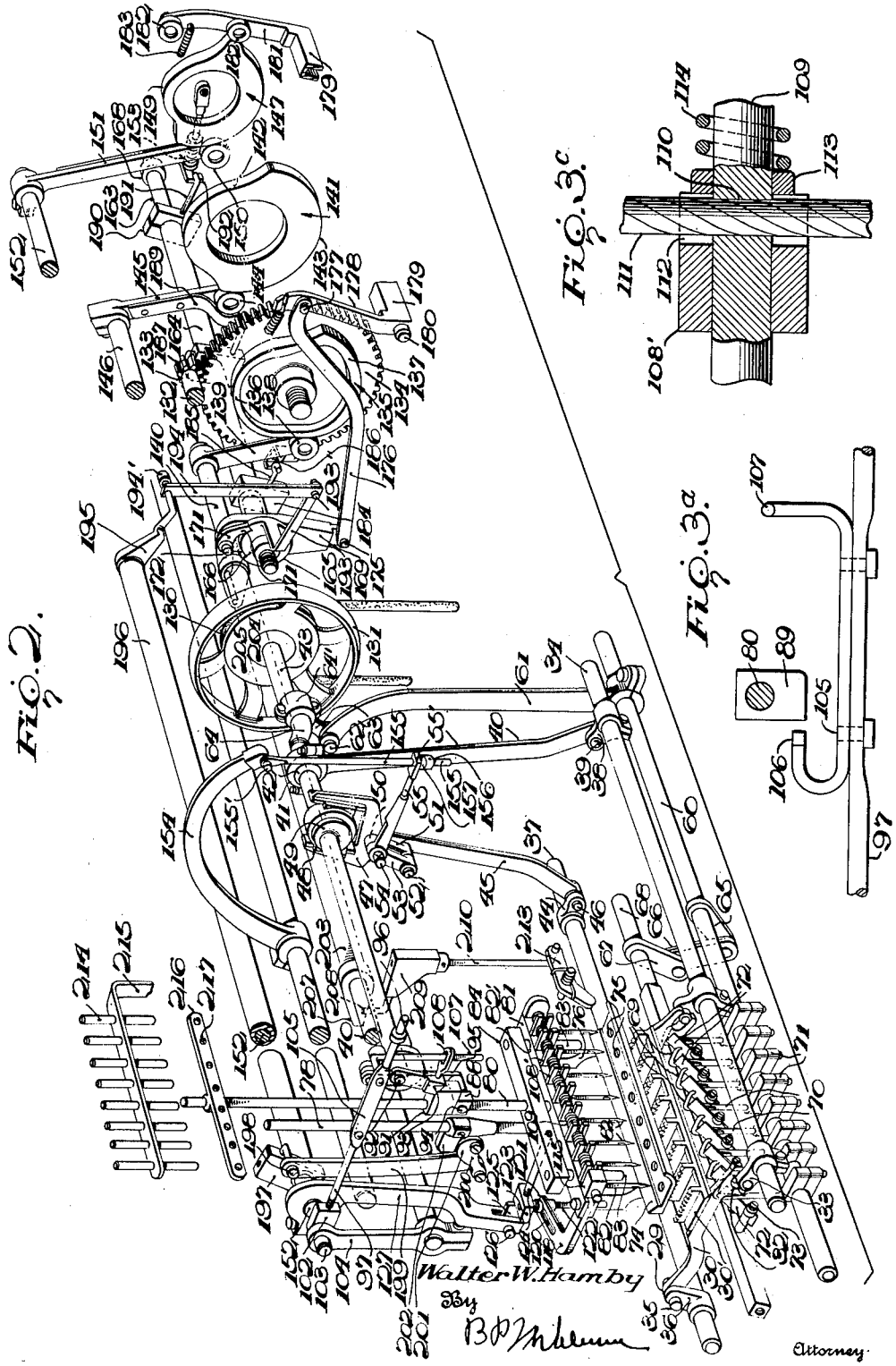

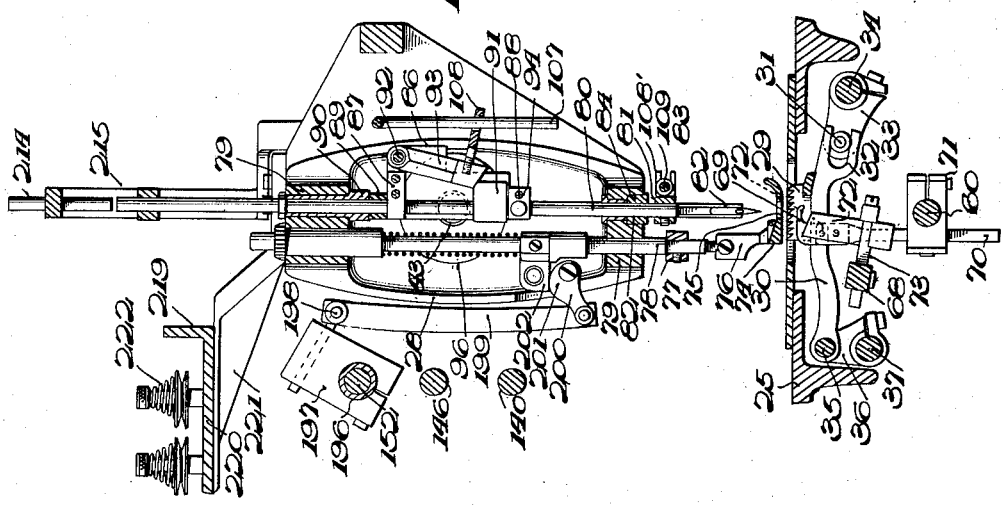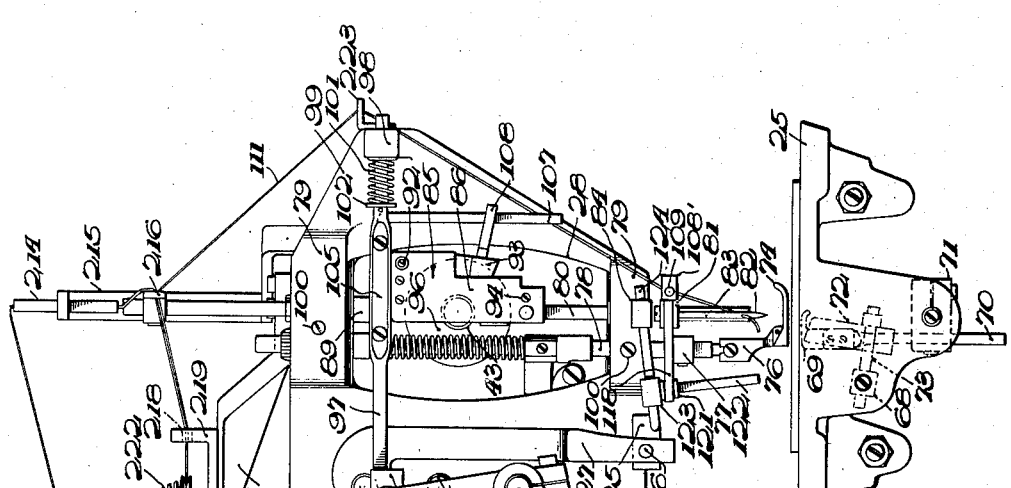

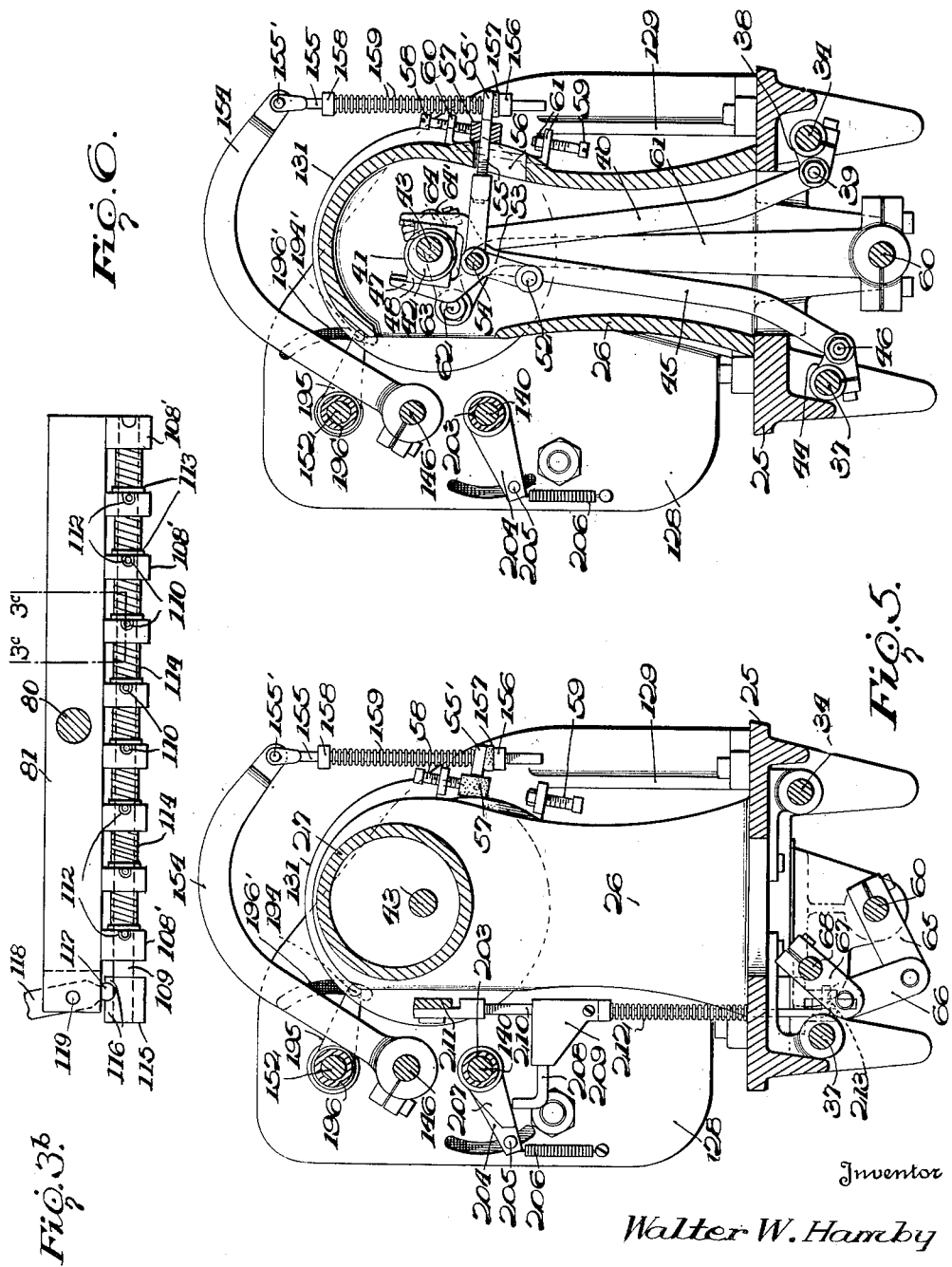

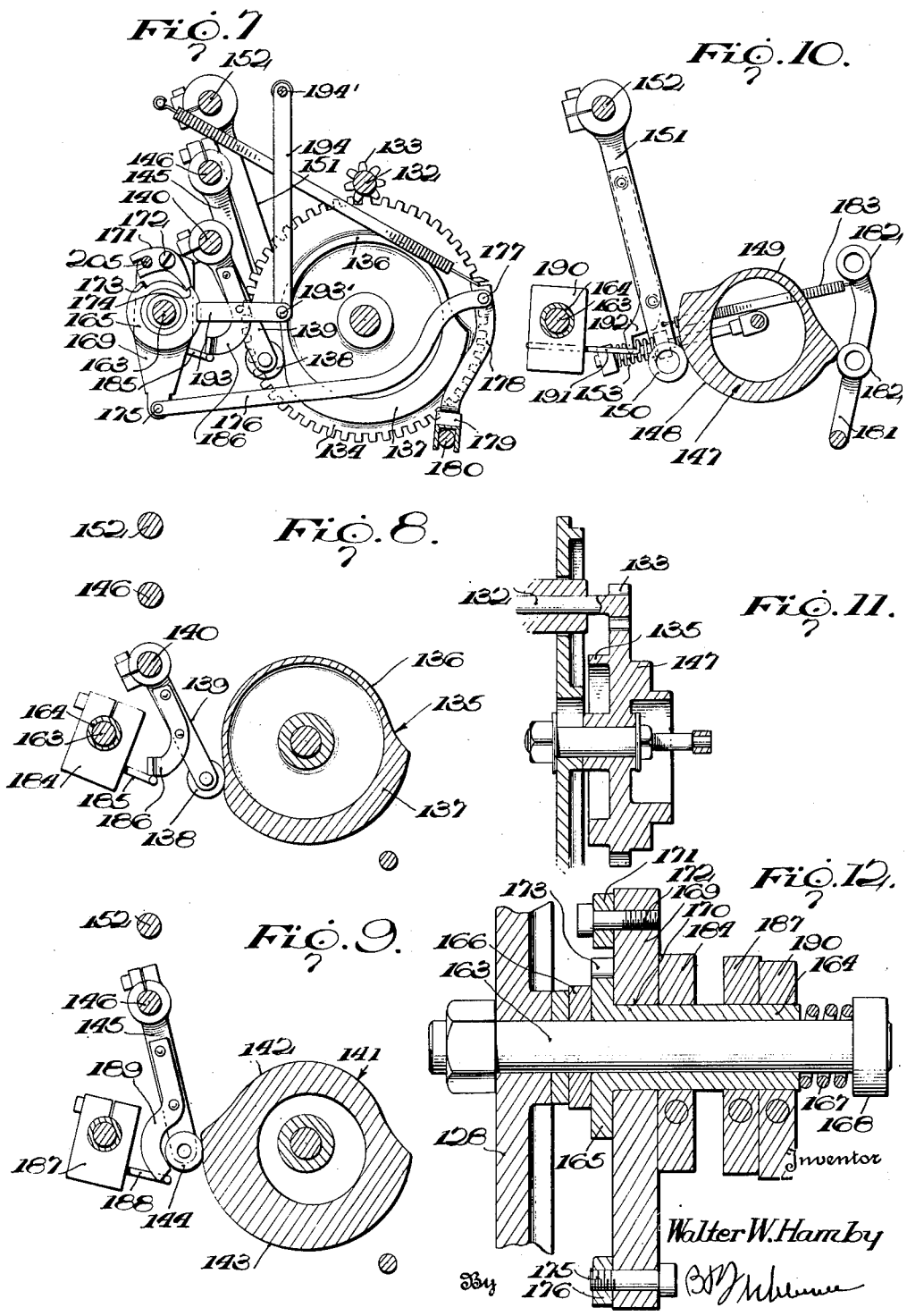

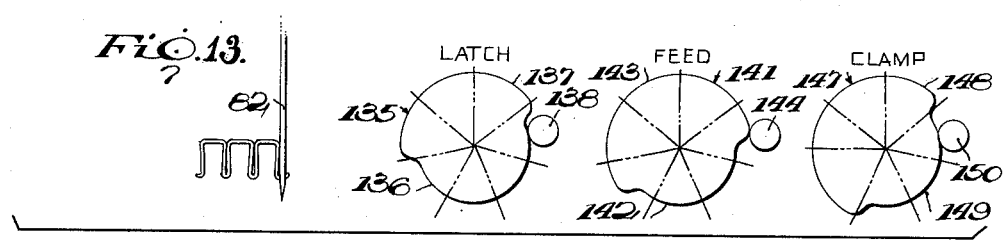
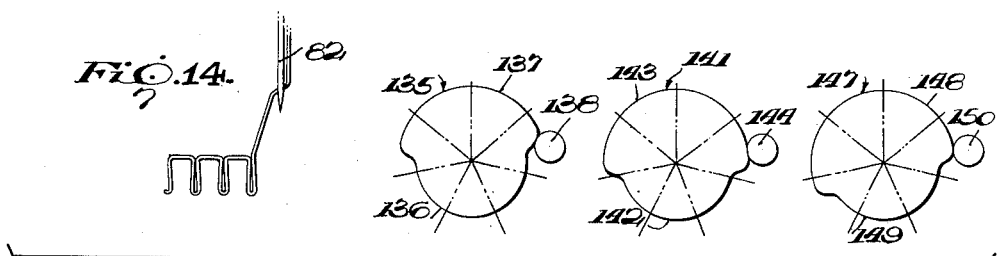
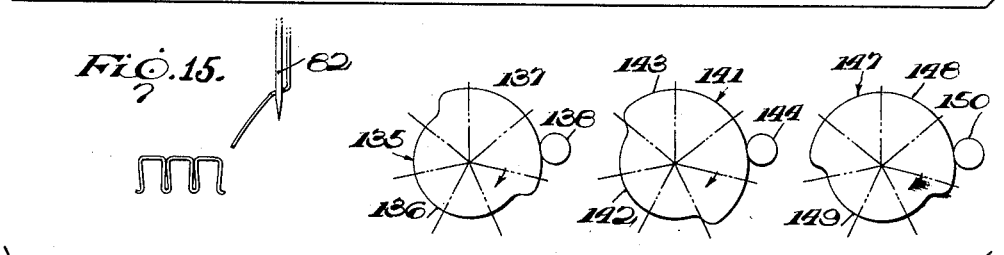
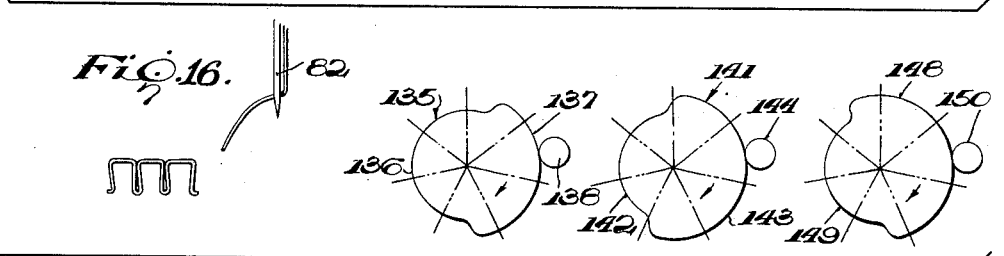
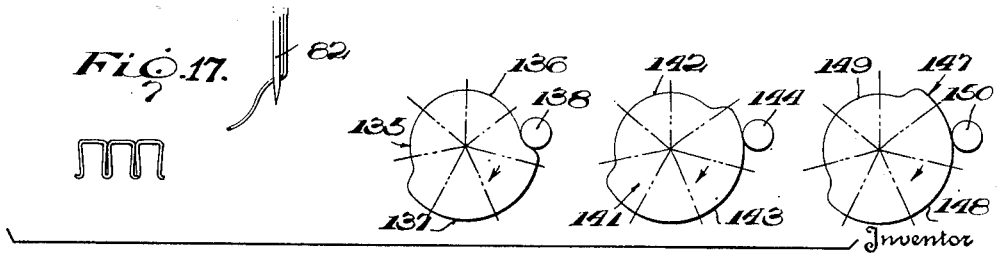
Inventor
Walter W. Hamby

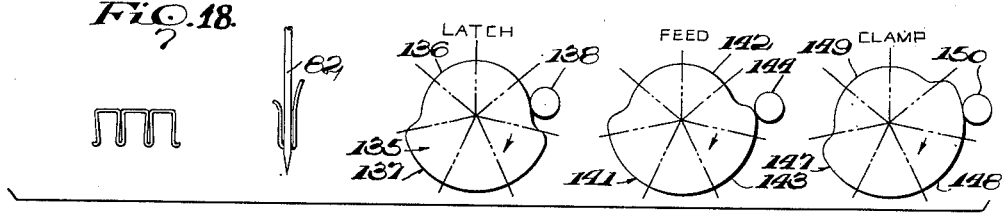
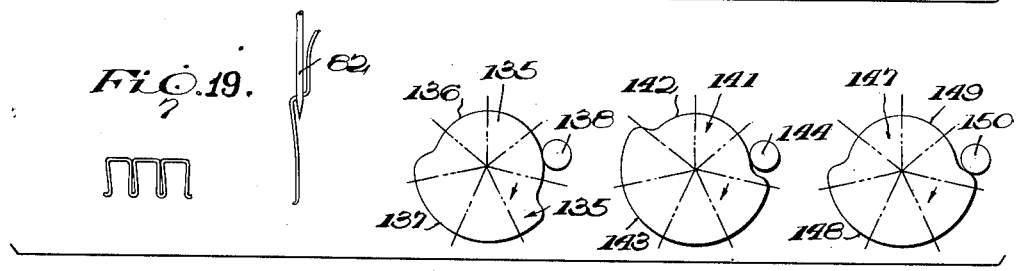
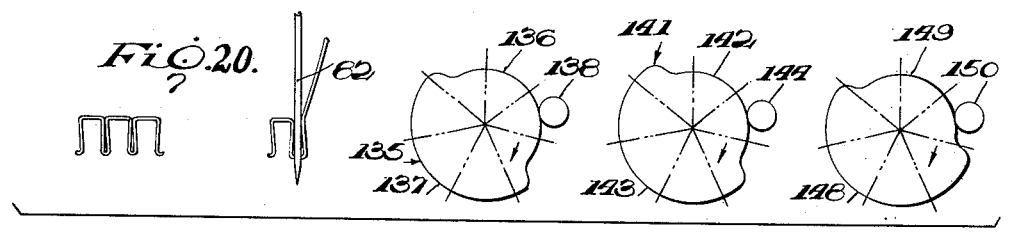
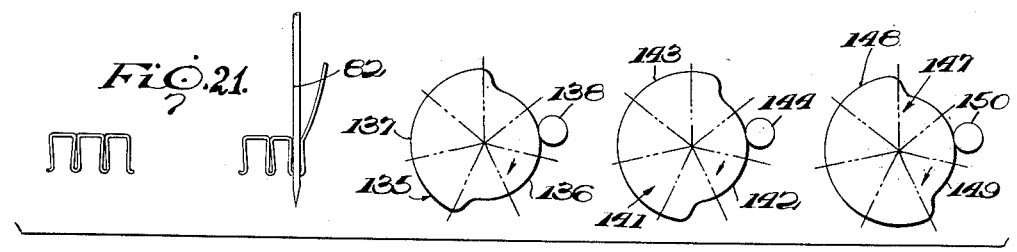
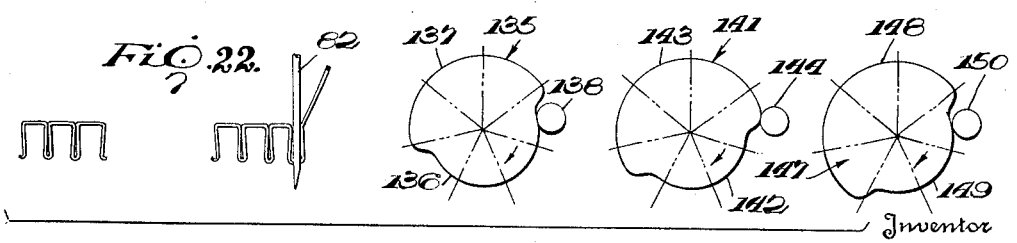

2,595,355

UNITED STATES PATENT OFFICE 2,595,355

MULTIPLE NEEDLE TUFTING MACHINE

Walter W. Hamby, Dalton, Ga., assignor of one-fifth to Isaac C. Adams, Dalton, Ga.

Application May 20, 1949, Serial No. 94,456

15 Claims. (Cl. 112—79)

My invention relates to tufting machines for producing spaced tufts or spaced groups of tufts.

An important object of the invention is to provide a machine of the above-mentioned character which operates a plurality of needles for producing spaced groups of tufts wherein each group embodies a plurality of sets of tufts.

A further object of the invention is to provide a yarn clamp of simplified construction and which is well adapted for use in connection with a multiple needle tufting machine.

A further object of the invention is to provide means, at the control of the operator, which will cause the machine to complete the formation of the tufts, then unlatch the needle bar and hold the same raised, clamp the yarn and feed the work for two feeds and sever all loops on the looper, and then automatically raise the presser foot.

A further object of the invention is to provide means, under the control of the operator, to automatically free the work from the machine, at the will of the operator, so that the work may be shifted as desired.

A further object of the invention is to provide yarn tension and guide means which will afford free feeding of the yarn upon the down stroke of the needle and a substantially constant tension upon the yarn on the upstroke of the needle.

A further object of the invention is to provide a machine of the above-mentioned character, the operating parts of which function in automatic timed order.

Other objects and advantages of the invention will be apparent during the course of the following description.

In the accompanying drawings, forming a part of this application and in which like numerals are employed to designate like parts throughout the same, Figure 1 is a side elevation of a tufting machine embodying by invention, Figure 2 is an exploded perspective view of the operating parts of the machine, Figure 3 is a front end elevation of the machine, Figure 3a is a plan view of the reciprocatory rod and holder carried thereby which retains the needle bar in the raised position, parts broken away, Figure 3b is a plan view of the yarn clamp, parts broken away, Figure 3c is a vertical section through one block and associated elements, taken on line 3c—3c of Figure 3b, Figure 4 is a vertical section taken on line 4—4 of Figure 1, Figure 5 is a similar view taken on line 5—5 of Figure 1, Figure 6 is a similar view taken on line 6—6 of Figure 1, Figure 7 is a similar view taken on line 7—7 of Figure 1, Figure 8 is a similar view taken on line 8—8 of Figure 1, Figure 9 is a similar view taken on line 9—9 of Figure 1, Figure 10 is a similar view taken on line 10—10 of Figure 1, Figure 11 is a central vertical longitudinal section taken through the cam unit, Figure 12 is a central vertical longitudinal section taken through the roller holding device, Figures 13 to 22 inclusive are diagrammatic views showing the relative positions of the needle, cams and rollers, during the operation of the machine.

In the drawings, wherein for the purpose of illustration is shown a preferred embodiment of my invention, the numeral 25 designates a bed, upon which is rigidly mounted a stock 26, carrying a tubular overhanging arm 27, provided with a head 28.

The base 25 is equipped with the usual throat plate having an opening for the passage of the teeth of the feed dog 29, carried by the feed dog bar 30. One end of this feed dog bar is raised and lowered by a roller 31, Figure 4, operating within a slot 32. This roller is carried by a vertically swinging crank 33, rigidly mounted upon a rock shaft 34, mounted in suitable bearings beneath the base 25, as is well known. The opposite end of the feed dog bar 30 is pivotally connected, as shown at 35, with a vertically swinging crank 36, rigidly mounted upon a rock shaft 37, arranged beneath the base 25 and suitably held in bearings, as is well known. The crank 36 serves to move the feed dog longitudinally, as it is raised and lowered. This is the conventional feed dog arrangement. The rock shaft 34, Fig. 6, has a crank 38 rigidly secured thereto, pivotally connected at 39 with a connecting rod 40, extending upwardly and connected with an eccentric strap 41, engaging an eccentric 42, rigidly mounted upon a main drive shaft 43, suitably journalled within the tubular arm 27. The companion rock shaft 37 has a vertically swinging crank 44 rigidly secured thereto, having a lever 45 pivotally connected therewith, as shown at 46. This lever extends upwardly and is equipped with a fork 47, receiving a vertically sliding member 48, having a cylindrical opening for rotatably receiving an eccentric 49. This eccentric is rigidly mounted upon the main drive shaft 43. The lever 45 is pivotally mounted at 50 upon the upper end of a link 51, Figure 2, and this link is pivotally mounted at its lower end as shown at 52 upon a bell crank lever 53. This bell crank lever is mounted upon a fixed pivot 54. The bell crank lever has a rod 55 rigidly secured thereto and extending to the exterior of the stock 26 through an opening 56 and the rod 55 has an apertured head 55', Figures 5 and 6. This rod 55 carries a shock-absorbing sleeve 57, formed of fiber, rubber or the like, and arranged between vertically adjustable stops or screws 58 and 59, carried by brackets 60 and 61 respectively, rigidly secured to the stock. When the bell crank lever 53 has its right end, Figures 2 and 6, swung upwardly, its opposite end is swung downwardly and the link 51 is lowered, which results in lowering the pivot 50 of the lever 45. This increases the distance between the pivot 50 and the center of the eccentric 49, with the result that the longitudinal movement of the lever 45 caused by the eccentric 49 is reduced and the feed dog has a shortened throw. The stop 58 limits the upward movement of the rod 55 and by this means the shortened throw of the feed dog may be limited or adjusted. When the rod 55 is moved downwardly, the pivot 50 is moved upwardly and the lever 45 is moved longitudinally for an increased distance by the action of the eccentric 49, whereby the feed dog has its throw lengthened. The sleeve 57 engages the stop 59 and by adjusting the stop 59 the lengthened throw of the feed dog may be regulated. The bell crank lever 53 and its connection with the lever 45 to regulate its movement, is conventional, but I have improved upon this construction by providing the adjustable stops 58 and 59, and the automatic means to move the rod 55, as will be described.

Arranged beneath the base 25 is a central rock shaft 60, Figures 1, and 2 to 6, suitably journalled beneath the base. This rock shaft has a vertical lever 61 rigidly mounted thereon and this lever has a pivotal connection at its upper end, as shown at 62, with a link 63, and this link is pivotally connected with a crank 64 formed upon the main drive shaft 43 by means of a head 64'. The central rock shaft 60 has a crank 65 rigidly secured thereto, pivotally connected with a link 66, and this link is pivotally connected with a crank 67, rigidly secured to an auxiliary rock shaft 68. This rock shaft is suitably mounted upon the base.

The numeral 69 designates a plurality of loopers, Figures 1, 2, 3 and 4, the hooks of which face in the opposite direction to the feed of the work and have preferably downturned ends. Each looper is rigidly mounted upon a looper staff 70, carried by a clamp 71, adjustably rigidly mounted upon the rock shaft 60. A cutter or hack saw 72 is provided for each looper, and is carried by an adjustable clamp 73, mounted upon the rock shaft 68. This cutter has a shearing action with the looper to sever the loops as they are formed thereon, and leave one loop unsevered.

The numeral 74 designates a presser foot, Figures 1, 2, 3, and 4, arranged above the bed 25 and feed dogs 29 and having openings 75 corresponding in number and arrangement, to the needles, as will be explained. This presser foot 74 is pivotally connected with vertical bars 76, carried by a horizontal bar 77, rigidly connected with a vertical reciprocatory presser foot bar 78 slidable within openings formed in guides 79 of the head 28.

The numeral 80 designates a needle bar, Figures 1, 2, 3, 4, slidable within the guides 79. This needle bar has a horizontal bar 81, rigidly secured to its lower end, carrying needles 82, corresponding in number and arrangement to the openings 75 of the presser foot and the associated loopers. The horizontal bar 81 has vertical openings 82, slidably receiving vertical guide rods 83, carried by a stationary horizontal bar 84. The stationary bar 84 is rigidly secured to the lower end of the head 28.

Means are provided to reciprocate the needle bar and then hold it against movement in the elevated position. This means comprises a latch housing 85, Figures 1, 2, 3 and 4, slidable upon the needle bar. This latch housing comprises sides 86, having a block 87 rigidly secured to their upper ends and a block 88 rigidly secured to their lower ends. The block 87 has an opening for slidably receiving the needle bar 80, and the block 88 has an opening for slidably receiving the needle bar 80. A block 89 is rigidly secured to the needle bar and is adapted to engage with a shock-absorbing washer 90 formed of leather, rubber, or the like. The needle bar 80 has a block 91 rigidly mounted thereon and arranged between the sides 86 and above the block 88. The sides 86 carry a pivot 92, connected with a latch 93, operating between the sides 86, and the lower end of this latch engages over the block 91. When the latch 93 is in the inner or projected position, it engages the block 91 and the downward movement of the latch housing 85 will move the needle bar 80 downwardly and when the housing moves upwardly, it raises the needle bar, since the block 88 contacts with the block 91, and hence when the latch 93 is in the projected position the housing 85 and the needle bar 80 reciprocate as a unit. When the latch 93 is retracted, and the housing 85 moves downwardly, such housing will not move the needle bar downwardly, the housing being slidable over the block 91. The block 88 has a pin 94 rigidly secured thereto, and this pin is pivotally connected with a link 95, pivotally connected with a cam crank 96, rigidly mounted upon the drive shaft 43. It is obvious that the latch housing 85 is continuously reciprocated during the rotation of the drive shaft.

Arranged near the upper end of the head 28 is a horizontal rod 97, Figures 1, 2, 3, the free end of which is slidable within an apertured knuckle 98 formed upon a head plate 99, which is rigidly secured to the head 28 by screws 100. The rod 97 is urged to the left, Figure 3, by a compressible coil spring 101, surrounding same and engaging a washer 102 and the apertured knuckle 98. The opposite end of the rod 97 is connected with a coupling block 102, which is pivoted at 103, with an upstanding crank 104. Rigidly secured to the rod 97 is a rod 105, and one end of this rod is bent to provide a horizontal finger 106, the free end of which is preferably bevelled, and this finger is adapted to be moved beneath the block 89, into and out of the path of travel of the same. The rod 105 is bent to provide a depending portion 107, which extends through an aperture in an arm 108, rigidly secured to the latch 93 and projecting laterally therefrom. The spring 101 moves the latch 93 to the closed position for locking the housing 85 to the needle bar 80, and when the rod 97 is moved to the right, Figure 3, the finger 106 will engage beneath the block 89, thereby holding the needle bar 80 elevated while portion 107 moves the latch 93 to the retracted or released position.

I provide a yarn clamp for the several strands of yarn passing through the needles, and this yarn clamp is mounted upon the horizontal bar 81, for movement therewith. The yarn clamp comprises blocks 108', Figures 1, 2, 3, 4, preferably integral with the bar 81. These blocks have horizontal openings for receiving a horizontal reciprocatory clamp rod 109, having vertical openings 110, for receiving the strands 111. The blocks 108' have vertical recesses 112 to receive the openings 110 and yarn. Washers or clamp elements 113 are slidable upon the clamp rod 109 and are moved to the left toward the blocks 108 by springs 114. When the clamp rod 109 is shifted to the left, Figure 3b, the yarn 111 moves into the vertical recesses 112, and the washers 113 are moved into engagement with the blocks 108' and these washers cannot exert pressure upon the yarn, which is free to run within the openings 110. When the clamp rod 109 is shifted to the right, Figure 3b, the yarn 112 presses against the clamp washers 113, yieldingly supported by the springs 114, and these clamp washers will clamp the yarn within the openings 110. The washers 113 are moved out of contact with the blocks 108' when this clamping action occurs. The clamp rod 109 has a shifting block 115 rigidly secured to one end thereof, and this block has teeth 116, and engaging between these teeth is a tooth 117 of a horizontal swinging bell crank lever 118, pivoted at 119 upon the bar 81. This bell crank lever is provided with a longitudinal slot 120, receiving a grooved roller 121, carried by a depending vertical pin 122. This pin is rigidly secured to a block 123, clamped upon a horizontal rod 124, slidably mounted within an opening formed in the stationary guide bar 84. The horizontal rod 124 has an apertured knuckle 125, pivotally connected at 126 with a vertically swinging crank 127.

Disposed at the driving end of the tubular arm 27, is a vertical plate 128 rigidly secured to the base 25 by brackets 129, Figures 1, 2, 5, and 6. The main drive shaft 43 is equipped with the usual grooved pulley 130, which is power driven and is also provided with a hand wheel 131. A shaft 132 extends through an opening in the plate 128 and is rigidly connected with the end of the main drive shaft 43 for rotation therewith. The shaft 132 has a gear 133 rigidly mounted thereon and this gear is in permanent mesh with a larger gear 134, included in a cam unit. The ratio between the gears 133 and 134 is one to seven. The cam unit is integral and includes an inner latch cam 135 having a low part 136 and a high part 137. This latch cam engages a roller 138, Figures 7, 8, carried by a crank 139 rigidly mounted upon a lower horizontal rock shaft 140, journalled in suitable bearings in the front plate and the rear plate 128. This lower rock shaft has the crank 104 rigidly mounted thereon, Figure 3. The cam unit includes an intermediate feed cam 141, Figure 9, having a low part 142 and a high part 143. This cam 141 engages a roller 144, carried by a crank 145, rigidly mounted upon an intermediate horizontal rock shaft 146, journalled in bearings formed in the front and rear vertical plates. The cam unit further comprises an outer clamp cam 147, Figure 10, including a high part 148 and a lower part 149. Arranged to engage the cam 147 is a roller 150 carried by a crank 151, rigidly mounted upon an upper rock shaft 152, having the crank 127 rigidly mounted thereon.

The roller 138 is retained in engagement with the cam 135 by the spring 101 of the horizontal rod 97, Figure 3. The roller 150 is retained in engagement with its cam 147 by a spring 153, Figure 10.

Rigidly mounted upon the intermediate rock shaft 146 is a vertically swinging curved arm 154, Figures 1, 2, 5 and 6, having a link 155 pivotally connected therewith by a bolt 155'. This link extends through the apertured head 55' and has a collar 156 rigidly secured thereto, with a leather washer 157 between the collar and head 55'. An upper collar 158 is clamped upon the link 155, and a compressible coil spring 159 surrounds the link 155 between the collars 156 and 158. A second link 160 is pivotally connected with the arm 154 by the bolt 155', and the link 160 has a collar 161 clamped thereon. This link has its lower end operating through an opening formed in the horizontal end 162 of a stationary bracket, and a compressible coil spring surrounds the link 160 and is confined between the collar 161 and the horizontal end 162 of the stationary bracket, and this spring swings the arm 154 upwardly and keeps the roller 144 in engagement with its cam 141.

A roller latching device is provided to hold the several rollers in the outer position when shifted thereto by the high parts of the several cams of the cam unit. This roller latching mechanism includes a horizontal shaft 163, Figures 1, 2, 5 to 12, mounted upon the rear vertical plate 128 near and beneath the lowermost rock shaft 140. The device includes a sleeve 164, Figure 12, mounted to turn upon the stationary horizontal shaft 163, and this sleeve has an annular flange or disc 165 integral therewith. This disc 165 engages a friction element or washer 166. The shaft 163 has a compressible coil spring 167 engaged by a nut 168, and this spring presses the disc 165 against the stationary washer 166, for frictional engagement, so that the sleeve 164 will remain in the shifted position, when moved thereto. An operating lever 169 is provided, having an opening 170, pivotally receiving the sleeve 164, and this operating lever has a double ended pawl 171 pivoted thereto, as shown at 172, Figure 7. This pawl is arranged to engage the opposite shoulders 173 and 174, formed upon the periphery of the disc 165. Pivotally connected with the lower end of the lever 169, as shown at 175, is the link 176, pivotally connected at 177 with a crank 178. This crank is rigidly mounted upon a horizontal bar 179 mounted upon a horizontal pivot 180, and the bar has a second upstanding crank 181 rigidly secured thereto, and this crank 181 carries rollers 182, arranged to engage the cam 147. The crank 181 is swung toward the cam 147 by a retractile coil spring 183 secured thereto and to the crank 151, Figure 10. It is thus seen that the cam 147 will have its high part swing the crank 181 outwardly or to the right, and this movement will swing the lever 169 upon its pivot, moving the upper end of the lever 169 counterclockwise, Figure 7.

Rigidly mounted upon the sleeve 164 is an inner block 184, Figure 8, having a finger 185, provided with a lateral extension to engage behind an extension 186 carried by the crank 139. Rigidly mounted upon the sleeve 164 is a block 187, Figure 9, carrying a finger 188 having a lateral extension to engage an extension 189 carried by the crank 145. An outer block 190, Figure 10, is rigidly mounted upon the sleeve 164, and carries a finger 191 having a lateral extension to engage with extension 192, carried by the crank 151. When the three cranks are shifted to the outer position by the high parts of the cams, these several fingers engage with the extensions of the cranks, and retain the cranks in the outer position, after the high parts of the cams have left the rollers of the cranks. This will hold the three rock shafts against turning movement, while the feed dogs continue to work.

The disc 165, Figures 2 and 7, has a horizontal crank or arm 193 rigidly secured thereto to swing in a vertical plane and the free end of this crank is pivotally connected at 193' with an upstanding link 194. The upper end of this link is connected with a pivot 194', connected with a crank 195, and the pivot 194' operates through a slot 196' in the rear vertical plate, and this crank is rigidly mounted upon the rear end of a sleeve 196, mounted to turn upon the upper shaft 152, Figures 1, 2, 5 and 6. At its forward end, this sleeve has a crank 197 rigidly secured thereto, having pivotal connection at 198 with a link 199, extending downwardly for a pivotal connection with a pivoted presser foot raising lever 200, Figure 4, having a cam 201, engaging beneath a block 202, mounted upon the presser foot bar 78 to raise it. When the sleeve 164 is turned in the direction for latching the cam cranks in the outer position, the sleeve 196 is turned and the presser foot is automatically raised.

Pivotally mounted upon the lower rock shaft 140 is a sleeve 203, Figures 2, 5 and 6, having a crank 204 rigidly mounted thereon, carrying a pin 205, engaging within a slot formed in the pawl 171. The crank 204 when released is swung downwardly by a spring 206. A second crank 207 is rigidly mounted upon the forward end of the sleeve 203, and this pawl is arranged above and engages a finger 208 carried by a vertically movable carriage 209, clamped upon a vertically movable rod 210. The upper end of this rod is pivotally connected with the vertically swinging lever 211, which is ordinarily employed to raise the presser foot but which is now disconnected from the presser foot. The carriage 209 is raised by a spring 212 which is stronger than the spring 206. The rod 210 projects below the base 25 and is pivotally connected with a pivoted bell crank lever 213 which is manually operated by any suitable means and may be connected with a pedal or the like to move the same. When the right end of the lever 213 is swung downwardly, the carriage 209 descends and the crank 207 moves downwardly and the crank 204 moves downwardly so that the pin 205 shifts the forked end of pawl 171 in engagement with the shoulder 173.

The strands of yarn pass through vertical tubes 214, Figures 1, 2, 3, and 4, mounted upon a stationary bracket 215 secured to the head 28. Each strand of yarn extends to the front face of a thread jerk 216 and passes rearwardly through a guide opening 217 therein and then passes through an opening 218 in a stationary guide 219 formed upon a support plate 220, mounted upon a stationary bracket 221, secured to the head 28. The strand of yarn then passes through an adjustable thread tension 222 and the strand is carried back upon itself and passed through the same opening 218 and the same opening 217 and then downwardly through an opening in a stationary guide 223, and downwardly beyond this guide 223 to and through the opening 110 in the clamp rod 109 and then it is threaded through the eye of the corresponding needle. The advantage in this construction is that when the needle bar is descending, the thread jerk 216 pulls the yarn and draws the same from the spool and there is no pull against the yarn at the needle. The needle bar and thread jerk move as a unit and there is no pull against the yarn at the needle when the needle rises, since there is sufficient yarn above the fabric and between the fabric and the eye of the needle. When the needle bar and thread jerk rise the yarn is drawn through the yarn tension from the slack adjacent to the lower end of the vertical tube 24 and not from the spool.

The crank 181 is continuously swung during the turning movement of the cam 147, and this crank continuously swings the lever 169. When the upper end of the lever 169 swings to the right, Figure 7, and the element 209 is raised, one end of the pawl 171 engages the shoulder 174 and turns the disc 165 clockwise, to the starting position. The pawl 171 will then move back and forth without further turning the disc 165, while the element 209 is raised. As soon as the element 209 is lowered, which is manually effected, the spring 206 will swing the pawl 171 to lower its left end, Figure 7, and the left or forward end of the pawl will then engage behind the shoulder 173, when the pawl 171 is in the proper position or has been moved to such proper position. When the upper end of the lever 169 is again swung counterclockwise, Figure 7, the roller holding device is turned in the direction so that it will hold the several cranks in the outer position. These cranks are shifted to the outer position prior to the completion of the swinging movement of the roller holding device for holding such cranks against return movement. When the element 209 is raised, the left end of the pawl 171 disengages the shoulder 173 and the right end of this pawl engages the shoulder 174, Figure 7, so that the roller holding device is swung in an opposite direction for releasing the cranks.

The operation of the machine will be more readily understood from a consideration of Figures 13 to 22 inclusive. Starting with the parts in the relative positions shown in Figure 13, the machine has been operating during the sewing period and a group of three tufts has been formed. The drive shaft 43 of the machine has made four complete revolutions by the time three tufts have been produced and the needle has moved above the fabric. During this time the roller 138 is travelling upon the low part 136 of the latch cam 135 and this low part has four units of the cam while the high part 137 has three units. During this operation the roller 144 was travelling upon the low part 142 of the feed cam 141, whereby a short feed is produced between the legs of each tuft. The low part 142 has three cam parts and a high part 143, four cam parts. When the needle reaches the lowered position, Figure 13, the roller 144 is passing upon the high part 143 of the feed cam 141 and will be completely upon this high part when the needle rises above the fabric and clears the same. During this operation, Figure 13, the roller 150 is engaging the low part 149 of clamp cam 147 and the yarn clamp is inactive during the formation of the three U-shaped tufts, except that the yarn clamp was active during the formation of the first leg of the first U-shaped tuft in the group. When the needle rises above the fabric, Figure 14, roller 138 engages the high part 137 of the latch cam 135 and the needle bar is unlatched from the latch housing 85. As soon as the needle rises above the fabric, Figure 14, the feeding of the fabric is started and the long feed is provided during the skip period, since the roller 144 is now engaging the high part 143 of the feed cam 141, and the yarn was clamped after the needle reached the end of its up stroke, since the roller 150 then engages the high part of the yarn clamp 147, Figure 14. Upon the completion of the rotation of the drive shaft, the first feed of the work is completed. The fabric is fed for the second feed upon the completion of the next rotation of the drive shaft, as shown in Figure 15, and all parts remain in the same relative position, since all rollers are engaging the high parts of their cams. The drive shaft now makes another complete revolution and the fabric is fed for the next complete step and the parts remain in the same relative position, since the rollers all engage the high parts of the cams, Figure 16. When the drive shaft makes another revolution, Figure 17, the latch housing 85 reaches the uppermost position, the roller 138 passes upon the low part 136 of the latch cam and the housing is latched to the needle bar at about the time that the housing is at the uppermost position or has moved slightly downwardly. The feeding action of the feed dog for the long feed, continues during the downward movement of the needle until the needle penetrates the fabric, since the roller 144 is still engaging the high part 143 of the feed cam 141. The yarn is continued clamped since the roller 150 is still engaging the high part 148 of the clamp cam 147, Figure 17. The continued rotation of the drive shaft, Figure 18, now causes the needle to pass through and below the fabric, and the housing is locked to the needle bar since the roller is engaging the low part of the latch cam 131, and the roller 144 is about to pass upon the low part of the feed cam, while the roller 150 still engages the high part of the clamp cam 147 and the yarn is still being clamped. Upon the upward movement of the needle, Figure 19, the looper having previously entered the formed loop, Figure 18, when the needle rises, Figure 19, one side of the previously formed loop slides about the looper and pulls out of the fabric, leaving one leg of the succeeding loop in the fabric, and the housing 85 remains latched to the needle bar, since the roller 138 engages the low part of the latch cam, and the fabric is fed for a short feed since the roller 144 engages the low part of feed cam 141. By the time the needle reaches the top position, Figure 19, the roller 150 begins to pass upon the low part of the clamp cam 147 and before the needle reaches the fabric, the roller is upon the low part of the clamp cam and hence the yarn is released. The needle continues its downward movement and passes through and below the fabric, forming a loop, Figure 20, and the housing 85 remains clamped to the needle bar, a short feed is effected for the work, and the yarn clamp is idle. The needle rises from the lowered position, Figure 20, while the looper engages within the formed loop. The loops are severed when the needle is near the raised position, and at least one unsevered loop remains upon the looper during the sewing period. In Figure 21, the needle has moved to the raised position and again moved to the lowered position to form the second loop, and the fabric is fed a short feed. The rollers and cams have the same relative position in Figure 21 as shown in Figure 20, since all rollers are engaging the low parts of the cams. In Figure 22 the needle has moved to the upper position and then moved to the lowered position to form the third loop and the parts have the same relative position as shown in Figure 13. In Figure 22 the latch housing is locked to the needle bar, the fabric is fed a long feed, and the yarn clamp is inactive.

The pivoted holding device is adapted to be actuated so that its fingers are moved into holding engagement with the cranks of the several rollers when the rollers are engaging the high parts of the cams. When the fingers have holding engagement with the cranks, the cranks are held in the outer position to which they have been shifted, when the cams continue to rotate. When the rollers are thus held in the outer position by the fingers, the housing is unlatched from the needle bar, the long feed of the work is effected, and the yarn is clamped. When the holding device is operated to hold the cranks and rollers in the outer position, the needle bar is held raised and the feed dogs will feed the work two strokes and all of the loops will be severed, after which the presser foot is raised. The yarn clamp is rendered active immediately when the needle is held in the raised position. It is thus seen that the work is entirely freed from the machine and the operator may shift the work to any desired position with respect to the machine while the drive shaft of the machine continues to rotate.

It is to be understood that the form of my invention herewith shown and described is to be taken as a preferred example of the same, and that various changes in the shape, size, and arrangement of parts may be resorted to without departing from the spirit of my invention or the scope of the subjoined claims.

Having described my invention, what I claim is:

1. In a tufting machine, a reciprocatory needle bar, a movable looper arranged near the needle bar, a movable blade to sever the loops upon the looper, a reciprocatory member arranged near the needle bar, a latch for detachably connecting the reciprocatory member and needle bar, a movable needle bar member for coaction with the needle bar to hold the same in the raised position when the needle bar is disconnected from the reciprocatory member, a mechanical device connected with the latch and the movable needle bar holding member to actuate the same, feed dog mechanism arranged near the needle bar to engage the fabric, a second movable holding member having a part to be brought into engagement with the mechanical device and provided with a shoulder, a lever arranged near the second movable holding member, a pawl carried by the lever to engage the shoulder of the second movable holding member, manually operated means connected with the pawl to move the same into the path of travel of the shoulder and cam means for operating the mechanical device and the lever.

2. In a tufting machine, a reciprocatory needle bar, a movable looper arranged near the needle bar, a movable blade to sever the loops upon the looper, a reciprocatory member arranged near the needle bar, a latch for detachably connecting the reciprocatory member and needle bar, a movable needle bar member for connection with the needle bar to hold the same in the raised position when the needle bar is disconnected from the reciprocatory member, a mechanical device connected with the latch and needle bar holding member to actuate the same, feed dog mechanism arranged near the needle bar to engage the fabric, a pivoted member having a finger to be brought into engagement with the mechanical device, a disc connected with the pivoted member and having spaced shoulders, a pivoted lever arranged near the pivoted member, a double-ended pawl mounted upon the pivoted lever to engage the shoulders of the disc, manually operated means connected with the pawl to shift the same upon its pivot, and cam means to operate the mechanical device and the lever.

3. In a tufting machine, a reciprocatory needle bar, a movable looper arranged near the needle bar, a movable blade to sever the loops upon the looper, a reciprocatory member arranged near the needle bar, a latch for detachably connecting the reciprocatory member and needle bar, a movable needle bar member for connection with the needle bar to hold the same in a raised position when the needle bar is disconnected from the reciprocatory member, a mechanical device connected with the latch and needle bar holding member to actuate the same, feed dog mechanism arranged near the needle bar to engage the fabric, a pivoted member having a finger to be brought into engagement with the mechanical device, a disc connected with the pivoted member and having spaced shoulders, a lever pivotally mounted upon the pivoted member, a double-ended pawl mounted upon the pivoted lever to engage the shoulders of the disc, manually operated means connected with the pawl to shift the same upon its pivot, cam means to operate the mechanical device and the lever, a presser foot arranged near the needle, and means connected with the presser foot to raise it including a crank connected with the pivoted member.

4. In a tufting machine, a reciprocatory needle bar, a movable looper arranged near the needle bar, a movable blade to sever the loops upon the looper, a device connected with the needle bar to reciprocate it, feed dog mechanism arranged near the needle bar, a presser foot arranged near the needle bar, a pivoted member having a shoulder, a pivoted lever arranged near the pivoted member, a pawl pivoted upon the lever to engage the shoulder, manually operated means to swing the pawl upon its pivot, a mechanical device connected with the presser foot to move it and including a crank secured to the pivoted member, and cam operated means to move the pivoted lever.

5. In a tufting machine, a reciprocatory needle bar, a generally horizontal bar mounted upon the needle bar and provided with spaced blocks having horizontal openings and vertical recesses, a reciprocatory clamp rod mounted within the horizontal openings of the blocks and having transverse openings to receive the yarn, transverse openings being movable into the recesses, clamping elements arranged between the blocks and having openings slidably receiving the clamp rod, springs mounted upon the clamp rod and engaging the clamping elements to shift them toward the recesses, a mechanical device connected with the clamp rod to move it in one direction, a plurality of needles carried by the generally horizontal bar, loopers arranged near the needles, blades to sever the loops upon the loopers, and feed dog mechanism arranged near the needle.

6. In a tufting machine, spaced blocks having horizontal openings and generally vertical recesses, a reciprocatory clamp rod mounted within the horizontal openings and having transverse openings to receive the yarn, the transverse openings being movable into the recesses, clamping elements arranged between the blocks and having openings slidably receiving the clamp rod, springs mounted upon the clamp rod and engaging the clamping elements to shift them toward the recesses, and a mechanical device connected with the clamp rod to move it in one direction.

7. In a tufting machine, a reciprocatory needle bar, a generally horizontal bar mounted upon the needle bar and provided with spaced blocks having horizontal openings and vertical recesses, a reciprocatory clamp rod mounted within the horizontal openings and having transverse openings to receive the yarn, the transverse openings being movable into the recesses, clamping elements arranged between the blocks and having openings slidably receiving the clamp rod, springs mounted upon the clamp rod and engaging the clamping elements, a pivoted bell crank lever connected with the clamp rod to move it in one direction, a horizontal rock shaft, a crank connected with the rock shaft and connected with the bell crank lever, a plurality of needles carried by the generally horizontal bar, loopers arranged near the needles, blades to sever the loops upon the loopers, feed dog mechanism arranged near the needle, and cam operated means to turn the rock shaft.

8. In a tufting machine, a reciprocatory needle bar, a generally horizontal bar mounted upon the needle bar, a plurality of needles carried by the generally horizontal bar, a plurality of yarn clamping devices mounted upon the generally horizontal bar, a generally horizontal rock shaft, a driving connection between the rock shaft and clamping devices including a crank, a reciprocatory member arranged near the needle bar, a latch to detachably connect the reciprocatory member and needle bar, a movable member for holding the needle bar in the raised position, a mechanical connection for operating the latch and the movable member, a second rock shaft, a crank connected with the second rock shaft and connected with the mechanical connection, a presser foot, means to raise the presser foot including a sleeve mounted upon one rock shaft, feed dog mechanism arranged near the needle, cranks connected with the rock shafts, cams to move the last named cranks, a pivoted holding member having parts for movement into engagement with the cranks, a pivoted lever arranged near the pivoted holding member, a mechanical device connected with the pivoted lever and operated by one of the cams, a pawl pivoted upon the lever to coact with the pivoted holding member, manually operated means to swing the pawl upon its pivot, including a sleeve mounted upon one rock shaft, and a crank connected with the pivoted holding member and connected with the first-named sleeve to turn the same.

9. In a tufting machine, a reciprocatory needle bar for carrying a needle at its lower end, an apertured thread jerk mounted upon the upper end of the needle bar to reciprocate therewith, a stationary guide tube mounted near and above the thread jerk, a stationary support, a yarn tension mounted upon the stationary support and arranged near the elevation of the lower end of the guide tube, and a yarn clamp mounted upon the needle bar near and above the needle, the yarn being passed through the tube and through the aperture of the thread jerk and through the yarn tension and back through the same aperture of the thread jerk and then through the yarn clamp through the eye of the needle.

10. In a tufting machine, a reciprocatory needle bar, a movable looper arranged near the needle bar, a movable cutter to sever the loop upon the looper, work feed means arranged near the looper, a clamp connected with the needle bar to reciprocate therewith and when rendered active to clamp the yarn, driving connecting means between the drive shaft and looper, driving connecting means between the cutter and drive shaft, driving connecting means between the drive shaft and work feed means, operating means connected with the drive shaft and including a latch to connect and disconnect the needle bar with and from the operating means, means including a latch cam to render the latch active and inactive, means including a clamp cam to render the clamp active and inactive, the latch cam and clamp cam being timed in operation with respect to the needle bar and each other so that the latch cam causes the operating means to reciprocate the needle bar during the sewing period, the clamp cam rendering the clamp active upon the down stroke of the needle bar and upon the next up stroke of the needle bar during the first cycle of operation of the sewing period so that a loop is formed and the trailing leg of the loop pulled out of the fabric around the looper to form a long tail when the needle bar approaches the end of such up stroke and then renders the clamp inactive for the remainder of the sewing period, and means to hold the needle bar in the raised position when the latch is rendered inactive.

11. In a tufting machine, a reciprocatory needle bar, a movable looper arranged near the needle bar, a movable cutter to sever the loop upon the looper, work feed means arranged near the looper, a clamp connected with the needle bar to reciprocate therewith and when rendered active to clamp the yarn, driving means for the looper and cutter and work feed means, operating means to reciprocate the needle bar and including a latch to connect and disconnect the needle bar with the operating means, means including a latch cam to render the latch active and inactive, and means including a clamp cam to render the clamp active upon the down stroke of the needle bar and upon the next up stroke of the needle bar during the first cycle of operation of the sewing period so that a loop is formed and the trailing leg of the loop pulled out of the fabric around the looper to form a long tail upon such up stroke and to render the clamp inactive for the remainder of the sewing period, and means to hold the needle bar in the raised position when the latch is rendered inactive.

12. In a tufting machine, a reciprocatory needle bar, a movable looper arranged near the needle bar, a movable cutter to sever the loop upon the looper, work feed means arranged near the looper, a yarn clamp connected with the needle bar to reciprocate therewith and when rendered active to clamp the yarn, means to drive the looper and cutter and work feed means, means to reciprocate the needle bar through a plurality of cycles of operations during the sewing period and then hold the needle bar raised during the skipping period, and means timed in operation with respect to the movement of the needle bar to render the clamp active during the down stroke and up stroke of the needle bar during its first cycle of operation in the sewing period and to then render the clamp inactive before the next cycle of operation of the needle in the sewing period.

13. In a tufting machine, a reciprocatory needle bar, a movable looper arranged near the needle bar, a movable cutter to sever the loop from the looper, work feed means arranged near the looper, means to drive the looper and cutter and work feed means, a clamp connected with the needle bar to reciprocate therewith and when rendered active to clamp the yarn, operating means to reciprocate the needle bar and including a latch to connect the needle bar with the operating means when the latch is active, means including a latch cam including a low part to render the latch active and a high part to render the latch inactive, means including a clamp cam having a high part to render the clamp active and a low part to render the clamp inactive, the leading end of the high part of the latch cam rendering the latch inactive and the leading end of the high part of the clamp cam rendering the clamp active at substantially the same time and the trailing end of the high part of the clamp cam extending rearwardly beyond the trailing end of the high part of the latch cam so that the low part of the latch cam renders the latch active while the high part of the clamp cam still renders the clamp active, means to rotate the cams in the same direction and hold them in fixed relation, and means to hold the needle bar in the raised position when the latch is inactive.

14. In a tufting machine, a reciprocatory needle bar, a movable looper arranged near the needle bar, a movable cutter to sever the loop upon the looper, work feed means arranged near the looper, means to drive the looper and cutter, adjustable means to operate the work feed means to vary its throw, a clamp connected with the needle bar to reciprocate therewith and when active clamped to the yarn, operating means to reciprocate the needle bar and including a latch to connect the needle bar with such operating means when the latch is active, means including a latch cam including a low part to render the latch active and a high part to render the latch inactive, means including a clamp cam having a high part to render the clamp active and a low part to render the clamp inactive, the leading end of the high part of the latch cam rendering the latch active and the leading end of the high part of the clamp cam rendering the clamp active at substantially the same time and the trailing end of the high part of the clamp cam extending rearwardly beyond the trailing end of the high part of the latch cam so that the low part of the latch cam renders the latch active while the high part of the clamp cam still renders the clamp active, means to operate the adjustable means including a feed cam including a low part which will cause the adjustable means to drive the feed means through a plurality of cycles of operation and at a short throw and a high part which will cause the adjustable means to operate the feed means through a plurality of cycles of operation at a long throw, the leading end of the high part of the latch cam rendering the latch inactive and the leading end of the high part of the feed cam causing the feed means to have a long throw at substantially the same time and the trailing end of the high part of the feed cam extending rearwardly beyond the trailing end of the high part of the latch cam so that the low part of the latch cam will render the latch active while the trailing end of the high part of the feed cam is still causing the adjustable means to operate the work feed means at a long throw.

15. In a tufting machine, a feed dog, means including a rock shaft to raise and lower one end of the feed dog, a second means including a rock shaft to move the feed dog longitudinally, a drive shaft, driving connecting means between the drive shaft and the first rock shaft, means to lock the second shaft including a lever having a head provided with an opening, an eccentric mounted upon the drive shaft and operating within the opening of the head, adjustable means pivotally supporting the lever and vertically movable to vary the distance of the pivot from the eccentric, an operating rock shaft, means connected with the operating rock shaft and driven thereby and connected with the adjustable means, and cam means to drive the operating rock shaft.

WALTER W. HAMBY.

REFERENCES CITED

The following references are of record in the file of this patent:

UNITED STATES PATENTS

| Number | Name | Date |
|---|---|---|
| 1,860,072 | Braudes | May 24, 1932 |
| 1,984,330 | Boyce | Dec. 11, 1934 |
| 2,176,957 | Covell | Oct. 24, 1939 |
| 2,194,876 | Sparks | Mar. 26, 1940 |
| 2,314,339 | Bradwell | Mar. 23, 1943 |
| 2,411,883 | Kile | Dec. 3, 1946 |
| 2,449,529 | Hofmann | Sept. 14, 1948 |